3,105,840
ALKYL ETHERS OF 17α-HYDROXY-19-NOR PROGESTERONE

Roger E. Beyler, Westfield, N.J., assignor to Merck & Co., Inc., Rahway, N.J., a corporation of New Jersey
No Drawing. Filed Dec. 12, 1958, Ser. No. 779,816
1 Claim. (Cl. 260—397.4)

This invention relates to the preparation of valuable new steroids. More particularly, it relates to ethers of 17-hydroxy-20-keto steroids having at least a 2-carbon sidechain at the 17 position. It also relates to a method for the preparation of such new 17-ether derivatives.

It is well-known that a number of 17-hydroxy-3,20-diketo steroids of the pregnane and the 19-nor pregnane series have valuable physiological activity. Attempts to enhance the activity by formation of derivatives have met with very little success; the primary result of such attempts has been the formation of esters of hydroxy substituents which may or may not promote some prolongation of such activity when administered to patients. Ethers at other positions of the steroid nucleus are known, but they have no essential physiological activity and have been prepared only as intermediates in the preparation of other valuable steroid products. Thus, 3-enol ethers have been made in order to protect the 3-ketone substituent while performing various chemical reactions to modify other substituents in the molecule.

It is an object of my invention to provide new steroid derivatives of the pregnane and the 19-nor pregnane series, having an ether substituent located at the 17 position. An additional object is the provision of a process for the preparation of such ethers from the corresponding 17-hydroxy steroids. Another more specific object is the provision of new 17-ethers of 17-hydroxy progesterone and substituted 17-hydroxy progesterone and methods for the preparation of these new compounds.

The process of this invention essentially comprises contacting a 17α-hydroxy-3,20-diketo steroid with a mono halogenated hydrocarbon, in which the substituent is either bromine or iodine, with a milk base such as silver oxide to form the corresponding 17-ether, which itself has valuable physiological activity or which may be converted into such a compound by chemical manipulations affecting other substituents of the molecule.

Among the compounds of this invention are 17-ether derivatives of known physiologically active 17α-hydroxy-3,20-diketo steroids of the pregnane and the 19-nor pregnane series, having the basic formula;

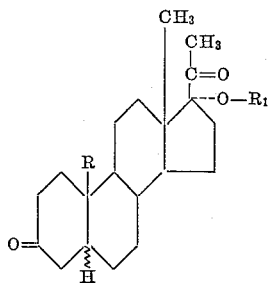

wherein R is a hydrogen or a methyl substituent, $R_1$ is a monovalent radical derived from a substituted or unsubstituted hydrocarbon and the hydrogen at the 5-position is either in the α or β configuration. The compounds of my invention include not only those described by the above basic structural formula, but also those in which the basic structural formula is substituted at various positions. Thus, compounds having alkyl, nitro, halo (chloro, bromo and fluoro) oxygen, (hydroxy, keto or acyloxy) and others located at positions 2, 3, 4, 6, 7, 9, 11, 12, 16 and 21 are contemplated. Also included are compounds which have one or more double bonds especially in the 1,2; 4,5; 9,11; or the 11,12 position of the molecule. Certain of the parent steroids are compounds which are known to have progestational activity. The 17-ether derivatives of such compounds, which include certain of the new compounds of our invention, have been found to have markedly improved physiological activity when compared to the parent 17α-hydroxy steroid.

I have found that when a 17α-hydroxy-3,20-diketo steroid of the pregnane or the 19-nor prenane series is combined with a monohalogenated hydrocarbon in the presence of silver oxide that the 17-hydroxy substituent is etherified. This result is surprising in view of the fact that, to the best of my knowledge, 17-ether derivatives of steroids of the pregnane and the nor pregnane series were previously unknown. The present discovery is believed to be unobvious since the 17-hydroxy substituent in a 17-hydroxy-3,20-diketo steroid is a tertiary hydroxyl and is present in a relatively hindered portion of the molecule. The difficulty of forming ethers of tertiary alcohols is well known, the usual result of attempts to form such compounds being degradation, rearrangement in the tertiary alcohol being treated or no reaction at all. In this particular series of steroid compounds it might be expected that certain of these difficulties would be more pronounced because of the known sensitivity to acid and base of the sidechain in 17α-hydroxy-20-keto steroids.

The starting steroid materials which can be used in the process of my invention are 17-hydroxy-3,20-diketo steroids of the pregnane or the 19-nor pregnane series. These starting materials may be either saturated pregnane (including allopregnane) or 19-nor pregnane compounds which have essentially no physiological activity or they may be the corresponding unsaturated pregnane or 19-nor pregnane compounds which are known to have some physiological activity. All of the known active 17-hydroxy-3,20-diketo compounds of the pregnane and the 19-nor pregnane series, in addition to having the desirable pharmalogical activity, ordinarily have, associated with this pharmalogical activity, some side effects which may be deleterious to the patent being treated.

Included among the compounds which are desirable starting materials in my novel process are 17α-hydroxy-3,20-diketo steroids as, for example, 17α-hydroxy-4-pregnene-3,20-dione, 17α-hydroxy-6-methyl-4-pregnene-3,20-dione, 6-fluoro-17α-hydroxy-4-pregnene-3,20-dione, 9α-bromo-17α-hydroxy-4-pregnene-3,11,20-trione, 6-nitro-17α-hydroxy - 4 - pregnene-3,20-dione, 17α-hydroxy-16α-methyl-4-pregnene-3,20-dione, 17α - hydroxy-16β-methyl-4-pregnene-3,20-dione, 21-fluoro-17α-hydroxy-4-pregnene-3,20-dione and 6α-methyl-17α-hydroxy-4-pregnene-3,20-dione. In addition, other compounds having an oxygen substituent at the 21-position are contemplated such as, for example, 21-acetoxy-17α-hydroxy-4-pregnene-3,11,20-trione, 21 - acetoxy - 11β,17α-dihydroxy-4-pregnene-3,20-dione, 21 - propionyloxy-17α-hydroxy-1,4-pregnadiene-3,11,20-trione, 21-benzyloxy-11β,17α-dihydroxy-1,4-pregnadiene-3,20-dione and the corresponding 9α-halo derivatives of the above compounds. 21-propionyloxy-17α-hydroxy-16α-methyl-4-pregnene-3,11,20-trione, 21 - butyryloxy-11β,17α-dihydroxy - 16α - methyl - 4-pregnene-3,20-dione, 21 - acetoxy - 17α-hydroxy-16α-methyl-1,4-pregnadiene-3,11,20-trione, 21-acetoxy-11β,17α-dihydroxy-16α-methyl-1,4-pregnadiene-3,20-dione, and the corresponding 9α-halo derivatives of the above-named compounds. Also included among the starting steroids in my process are the corresponding compounds having a saturated A-ring, i.e., 17α-hydroxy-pregnane-3,20-dione, 17α-hydroxy-allopregnane-3,20-dione and compounds which may have other substituents e.g. alkyl or fluoro at the 6α, 6β or the 16α or β position.

The starting steroid compound is mixed with a suitable amount of a monohalogenated hydrocarbon in which the halogen substituent is either bromine or iodine. The monohalogenated hydrocarbon may be saturated or unsaturated and may include, if desirable, other substituents which are inert under the reaction conditions. Included among the halogenated hydrocarbons which may be used in the process of my invention are saturated alkyl bromides or iodides, including cycloalkyl as, for example, iodomethane (methyl iodide), iodoethane (ethyl iodide), 1-iodopropane (n-propyl iodide), 2-iodopropane (isopropyl iodide), 1-iodopentane (n-pentyl iodide) and iodocyclohexane; bromomethane (methyl bromide), bromoethane (ethyl bromide), 1-bromopropane (n-propyl bromide), 1-bromopentane (n-pentyl bromide) and bromocyclohexene; aralkyl bromides and iodides as, for example, iodophenyl methane (benzyl iodide) and bromophenyl methane (benzyl bromide); and unsaturated halogenated hydrocarbons such as propargyl iodide, 1-iodo-2-butene (crotonyl iodide) 3-iodopropene-1 (allyl iodide) 3-iodo-3-methyl-propene-1, 1-iodo-2-methylpropene-2 (methallyl iodide) and cinnamyl bromide. By selecting one of the above-named halogenated hydrocarbons and reacting it with a selected 17α-hydroxy-3,20-diketo steroid in accordance with the process of my invention, there is formed the corresponding 17-ether of the starting 17-hydroxy-3,20-diketo steroid in which the hydrogen of the 17α-hydroxyl group is replaced by a hydrocarbon radical derived from the selected hydrocarbon reactant.

In order to bring about etherification of the 17-hydroxy group it is necessary to employ, in addition to the halogenated hydrocarbon, a mild base such as silver oxide; I have found that it is especially desirable to use the form of silver oxide which is described by B. Helferich and W. Klein in Justius Liebig's Annalen der Chemie, volume 450, p. 219 (1926). Essentially this method comprises the following procedure: 1 part by weight of silver nitrate is dissolved in approximately 10 parts by weight of water. Another solution is prepared by dissolving 0.23 part by weight of pure sodium hydroxide in approximately 10 parts by weight of water. The two solutions are heated to approximately 86° C. and mixed, whereupon the silver oxide precipitates. The supernatent is decanted and the silver oxide precipitate is washed by decantation with 5 portions of hot water or until the washings are essentially neutral. The precipitate of silver oxide is then filtered and air-dried. The precipitated, dried silver oxide is then slurried in about 5 parts of hot ethanol. The ethanol is decanted from the precipitate and it is then washed several more times with hot ethanol by decantation. The washed precipitate is then filtered and air-dried and dried in a desiccator over phosphorus pentoxide.

The solvent used for carrying out the etherification reaction may be any one which is inert or unreactive under the conditions of the etherification reaction. Thus, solvents which are effective as diluents are hydrocarbons as, for example, benzene, toluene, xylene; ethers such as diethyl ether, dimethyl ether, dioxane, tetrahydrofuran and anisole; N,N'-dialkyl acylamides as, for example, N,N'-dimethylacetamide, N,N'-dimethylformamide and N,N'-diethylformamide and nitriles such as acetonitrile. In addition to solvents which may act as diluents for the reagent, the monohalogenated hydrocarbon may act as a solvent for the reaction and, when it is desired to use large excesses of the monohalogenated hydrocarbon reactant, it may be desirable to use, instead of an additional solvent, the reagent itself as a solvent for the reaction.

The temperature at which the reaction is carried out is partially dependent on the time and does not appear to be the sole critical factor in the yield or purity of the product obtained. Thus, temperatures which vary from approximately 0° C. to the reflux temperature of the solvent employed appear to be satisfactory. Thus, we have found that when the reactants are mixed in the presence of a solvent at approximately 25° C. for a period of about 16 hours, good yields of product are obtained. Another method which has been found to produce satisfactory yields of the ether involves refluxing the steroid in the presence of silver oxide and methyl iodide for approximately 7 hours with no additional solvent added to the reaction mixture. Reactants which are more highly substituted may require longer times and higher reaction temperatures.

In a preferred mode of operation 17α-methoxy-4-pregnene-3,20-dione is prepared from the corresponding 17α-hydroxy-4-pregnene-3,20-dione by mixing the steroid with a large molar excess of methyl iodide and N,N'-dimethylformamide as a solvent in the presence of silver oxide. The mixture is stirred at approximately 25° C. for a period of about 16 hours. The product is recovered by extraction and chromatography and excellent yields of 17α-methoxy-4-pregnene-3,20-dione are obtained. In the event that the starting steroid reagent contains hydroxyl groups in addition to the 17α-hydroxy group, it is desirable to protect these other hydroxyl groups as, for example, by esterification; to prepare the 17-methyl ether of cortisone, it would thus be desirable to first protect the 21-hydroxy group of cortisone by formation of the 21-acetate by known methods, the etherification reaction is then carried out and the formed 17α-methoxy-21-acetoxy-4-pregnene-3,11,20-trione is hydrolyzed with an alkali by known methods to form 17α-methoxy-21-hydroxy-4-pregnene-3,11,20-trione without affecting the 17-ether substituent.

The following examples are furnished for purposes of illustration and not by way of limitation.

EXAMPLE 1

*17α-Methoxy-4-Pregnene-3,20-Dione*

A mixture of 100 mg. of 17α-hydroxy-4-pregnene-3,20-dione, 5.0 ml. of methyl iodide and 300 mg. of silver oxide [prepared according to the methods described in Justius Liebig's Annalen der Chemie by B. Helferich and W. Klein, volume 450, p. 219 (1922)], is stirred at the reflux temperature for approximately 7 hours. The entire reaction mixture is then filtered to remove the precipitated silver iodide, excess silver oxide and occluded impurities. The solid precipitate is then washed on the filter with chloroform to remove any occluded steroid. The filtrate and washings containing the product are combined and evaporated under reduced pressure to give a solid residue comprising the product. The residue is dissolved in benzene and chromatographed on 5 g. of acid-washed alumina. The eluate from the chromatograph column having a solvent composition of ether: petroleum ether (3:7) to (1:9) contains the desired 17α-methoxy-4-pregnene-3,20-dione. The product is recovered and purified by evaporation of the solvent from the eluate fraction and recrystallization of the residue. The purified 17α-methoxy-4-pregnene-3,20-dione melts at 209–211° C.

$\lambda_{max.}^{MeOH}$ 241 mm., E 16,400. $\lambda_{max.}^{Nujol}$ 5.87, 5.98, 6.20μ

Nuclear magnetic resonance data is consistent with the assigned structure, showing a $CH_3O$ grouping at 130.5 cycles on the high field side of benezene.

In similar manner and using as the steroid starting material 17α-hydroxy-19-nor-4-pregnene-3,20-dione the product obtained after purification is 17α-methoxy-19-nor-4-pregnene-3,20-dione.

EXAMPLE 2

*17α-Methoxy-4-Pregnene-3,20-Dione*

To a mixture of 100 mg. of 17α-hydroxy-4-pregnene-3,20-dione in 2 ml. of N,N'-dimethylformamide and 1 ml. of methyl iodide is added 200 mg. of silver oxide, prepared as described in Example 1. The mixture is then stirred at room temperature for approximately 16 hours. Approximately 25 ml. of chloroform is added and the resulting precipitate containing silver iodide is filtered off and washed with chloroform. The filtrate and washings are combined and evaporated under reduced pressure to give a residue of crude crystalline product. The product is purified by chromatography according to procedures described in Example 1 and recrystallized from methanol or methylene chloride/ether to give essentially pure 17α-methoxy-4-pregnene-3,20-dione.

This experiment can be carried out using benzene as the solvent instead of dimethylformamide and carrying out the reaction at the reflux temperature of the benzene for approximately 7 hours.

In the manner described above and employing in place of methyl iodide an equivalent amount of methallyl iodide, the product obtained by extraction and chromatography is 17α-methallyloxy-4-pregnene-3,20-dione.

In the manner described above and using ethyl iodide in place of methyl iodide, the product obtained after extraction and chromatography is 17α-ethoxy-4-pregnene-3,20-dione.

In the manner described above and using 1-iodo-n-pentane in place of methyl iodide, the product obtained after extraction and chromatography is 17α-amoxy-4-pregnene-3,20-dione.

EXAMPLE 3

17α-Methoxy-6α-Methyl-4-Pregnene-3,20-Dione

A mixture is prepared of 150 mg. of 17α-hydroxy-6α-methyl-pregnene-3,20-dione, 3 ml. of N,N'-dimethylformamide and 1.5 ml. of methyl iodide and to this is added 300 mg. of silver oxide prepared according to the procedure described in Example 1. The mixture is stirred at room temperature for approximately 16 hours. About 25 ml. of chloroform is added and the inorganic precipitate is filtered off and washed with chloroform. The filtrate and washings containing the product are combined and evaporated under reduced pressure to give a residue of crude crystalline product. The product is then purified by chromatography on 6 g. of acid-washed alumina. The eluate having a solvent composition of ether:petroleum ether (3:2) contains the major portion of the product. After evaporation of the solvent from the eluate, the product is further purified by recrystallization from methanol to give 17α-methoxy-6α-methyl-4-pregnene-3,20-dione having a melting point of 172–174° C.

EXAMPLE 4

6α-Nitro-17α-Methoxy-4-Pregnene-3,20-Dione

To 50 mg. of 6α-nitro-17α-hydroxy-4-pregnene-3,20-dione in 1 ml. of N,N'-dimethylformamide and 0.5 ml. of methyl iodide is added 100 mg. of silver oxide prepared according to procedures described in Example 1. The mixture is stirred at room temperature for approximately 16 hours. Chloroform is added to the reaction mixture and the inorganic precipitate containing the silver iodide is removed by filtration and washed with excess chloroform. The filtrate and washings containing the product are evaporated to dryness under reduced pressure and the resulting residue containing the crude 6α-nitro-17α-methoxy-4-pregnene-3,20-dione is dissolved in benzene and chromatographed on acid-washed alumina, to give essentially pure 6α-nitro-17α-methoxy-4-pregnene-3,20-dione.

In similar manner and using, in place of methyl iodide as the halogenated hydrocarbon reactant, ethyl iodide, the corresponding 6α-nitro-17α-ethoxy-4-pregnene-3,20-dione is prepared.

EXAMPLE 5

6α-Fluoro-17α-Methoxy-4-Pregnene-3,20-Dione

To 100 mg. of 6α-fluoro-17α-hydroxy-4-pregnene-3,20-dione in 5 ml. of methyl iodide and 5 ml. of N,N'-dimethylformamide was added 300 mg. of silver oxide prepared according to the method described in Example 1. The reaction mixture is stirred at 25° C. for about 72 hours. It is then filtered to remove the inorganic precipitate comprising silver iodide and the precipitate washed with chloroform. The filtrates and washings containing the product are evaporated under reduced pressure to give a crude residue comprising 6α-fluoro-17α-methoxy-4-pregnene-3,20-dione, which is purified by chromatography on acid-washed alumina followed by recrystallization from methylene chloride and ether. The product exhibits absorption in the ultra violet region at 235 mμ and the infra-red spectrum of the purified product shows no hydroxyl band in the 3 mμ region.

In similar manner, using as the steroid starting material 6α-chloro-17α-hydroxy-4-pregnene-3,20-dione and ethyl iodide as the halogenated hydrocarbon reactant, the corresponding 6α-chloro-17α-ethoxy-4-pregnene-3,20-dione is obtained.

EXAMPLE 6

17α-Methoxy-16α-Methyl-4-Pregnene-3,20-Dione

To 50 mg. of 17α-hydroxy-16α-methyl-4-pregnene-3,20-dione in 3 ml. of methyl iodide and 3 ml. of N,N'-dimethylformamide is added 180 mg. of silver oxide prepared according to the procedures described in Example 1. The mixture is stirred at 25° C. for approximately 72 hours. The formed inorganic precipitate containing silver iodide is filtered off and the precipitate washed with chloroform. The combined filtrates and washings containing the product are evaporated under reduced pressure to give a crude residue comprising 17α-methoxy-16α-methyl-4-pregnene-3,20-dione. The crude product is purified by chromatography on acid-washed alumina and recrystallized from a solution of methylene chloride and ether.

In similar manner, using 17-hydroxy-16α-methyl-4-pregnene-3,20-dione as the steroid starting material and allyl iodide as the halogenated hydrocarbon reactant, the product obtained is 17-allyloxy-16α-methyl-4-pregnene-3,20-dione.

In similar manner and using 17α-hydroxy-6α,16α-dimethyl-4-pregnene-3,20-dione as the steroid starting material and benzyl iodide as the halogenated hydrocarbon reactant, the product obtained after chromatography and recrystallization is 17α-benzyloxy-6α,16α-dimethyl-4-pregnene-3,20-dione.

EXAMPLE 7

17α-Methoxy-16β-Methyl-4-Pregnene-3,20-Dione

A mixture is prepared of 17α-hydroxy-16β-methyl-4-pregnene-3,20-dione, methyl iodide and silver oxide and the reaction is carried out using the proportions of reactants and the methods described in the preceding example. The product recovered after evaporation of the solvent, chromatography and crystallization is 17α-methoxy-16β-methyl-4-pregnene-3,20-dione.

In similar manner, using as the steroid starting material 17α-hydroxy-16β-methyl-4-pregnene-3,20-dione and N-propyl iodide as the halogenated hydrocarbon reactant, the product obtained after recovery and purification is 17-propionoxy-16β-methyl-4-pregnene-3,20-dione.

EXAMPLE 8

21-Fluoro-17α-Methoxy-4-Pregnene-3,20-Dione

A mixture is prepared of 100 mg. of 21-fluoro-17α-hydroxy-4-pregnene-3,20-dione, 5 ml. of methyl iodide and 300 mg. of silver oxide prepared according to the procedure described in Example 1. The mixture is stirred at the reflux temperature for approximately 72 hours. The inorganic precipitate containing silver iodide which formed during the course of the reaction is filtered off and washed with chloroform to recover any occluded product. The filtrate and washings are combined and evaporated under reduced pressure to give a crude residue of product comprising 21-fluoro-17α-methoxy-4-pregnene-3,20-dione. The crude residue of product is dissolved in benzene, chromatographed on acid-washed alumina and recrystallized from a mixture of methylene chloride and ether to give essentially pure 21-fluoro-17α-methoxy-4-pregnene-3,20-dione.

In similar manner and using N-butyl iodide as the halogenated hydrocarbon reactant, the product obtained after chromatography and crystallization is 21-fluoro-17α-butoxy-4-pregnene-3,20-dione.

Similarly, using 21-fluoro-17α-hydroxy-16α-methyl-4-pregnene-3,11,20-trione as the steroid starting material and methyl iodide as the halogenated hydrocarbon reactant the product obtained is 21-fluoro-17α-methoxy-16α-methyl-4-pregnene-3,11,20-trione.

EXAMPLE 9

9α-Fluoro-17α-Ethoxy-4-Pregnene-3,11,20-Trione

Approximately 100 mg. of 9α-fluoro-17α-hydroxy-4-pregnene-3,11,20-trione is mixed with 5 ml. of ethyl iodide 5 ml. N,N'-dimethylformamide 300 mg. of silver oxide prepared according to procedures described in Example 1. The reaction mixture is stirred at 25° C. for approximately 72 hours. The inorganic precipitate comprising silver iodide which is formed during the course of the reaction is removed by filtration and the precipitate washed with chloroform to recover any occluded steroid reaction product. The filtrate and washings are combined and evaporated under reduced pressure to give a residue comprising 9α-fluoro-17-ethoxy-4-pregnene-3,11,20-trione. The crude product is purified by chromatography on acid-washed alumina and recrystallization from methylene chloride and ether to give substantially pure product.

The same product is obtained in similar manner by substituting ethyl bromide in place of ethyl iodide in the above reaction.

EXAMPLE 10

9α-Chloro-17α-Ethoxy-4-Pregnene-3,11,20-Trione

In the manner described in the preceeding example, using as the steroid starting material 9α-chloro-17α-hydroxy-4-pregnene-3,11,20-trione in place of the corresponding 9α-fluoro-17α-hydroxy-4-pregnene-3,11,20-trione, the product obtained after chromatography and crystallization is 9α-chloro-17α-ethoxy-4-pregnene-,3,11,20-trione.

EXAMPLE 11

9α-Bromo-17α-Hydroxy-4-Pregnene-3,11,20-Trione

To 50 mg. of 9α-bromo-17α-hydroxy-4-pregnene-3,11,20-trione in 2.5 ml. of methyl iodide is added 150 mg. of silver oxide prepared according to methods described in Example 1. The reaction mixture is stirred under reflux for 72 hours. The formed inorganic precipitate comprising silver iodide is removed by filtration and washed with chloroform to remove any occluded steroid product. The filtrate and washings are combined and evaporated under reduced pressure to yield a crude residue comprising 9α-bromo-17α-methoxy-4-pregnene-3,11,20-trione which is purified by chromatography on acid-washed alumina and recrystallization from methylene chloride and ether.

In similar manner and using as the halogenated hydrocarbon reactant, benzyl iodide the steroid product obtained after chromatography and recrystallization is 9α-bromo-17α-benzyloxy-4-pregnene-3,11,20-trione.

EXAMPLE 12

To 300 mg. of 9α-chloro-17α-hydroxy-4-pregnene-3,11, 20-trione in 15 ml. of propyl iodide is added 900 mg. of silver oxide prepared according to the methods described in Example 1. The reaction mixture is stirred under reflux for 72 hours. The formed inorganic precipitate comprising silver iodide is removed by filtration and the precipitate washed with chloroform to recover any occluded steroid. The filtrate and washings containing the product are combined and evaporated under reduced pressure to give a crude residue comprising 9α-chloro-17α-propoxy-4-pregnene-3,11,20-trione which is purified by chromatography on acid-washed alumina and recrystallization from methylene chloride and ether.

In similar manner and using as the halogenated hydrocarbon reactant ethyl bromide, the corresponding 9α-chloro-17α-ethoxy-4-pregnene-3,11,20-trione is recovered and purified by chromatography and recrystallization.

EXAMPLE 13

9α-Fluoro-17α-Ethoxy-4-Pregnene-3,11,20-Trione

In the manner described in the preceeding example and using as the steroid starting material 9α-fluoro-17α-hydroxy-4-pregnene-3,11,20-trione, the product obtained after reaction with methyl iodide and silver oxide is 9α-fluoro-17α-methoxy-4-pregnene-3,11,20-trione which may be purified as described above using chromatography on acid-washed alumina and recrystallization.

EXAMPLE 14

9α-Fluoro-17α-Methoxy-11β-Hydroxy-4-Pregnene-11,20-Dione

A mixture is prepared of 50 mg. of 9α-fluoro-11β-17α-dihydroxy-4-pregnene-3,20-dione, 2.5 ml. of methyl iodide and 150 mg. of silver oxide prepared as described in Example 1. The reaction mixture is stirred at the reflux temperature for approximately 72 hours. The entire mixture is filtered to remove the formed inorganic precipitate comprising silver iodide and the precipitate is washed with chloroform to remove any steroid product. The filtrate and washings containing the product are combined and evaporated under reduced pressure to give a crude residue comprising 9α-fluoro-17α-methoxy-11β-hydroxy-4-pregnene-3,20-dione which is purified by chromatography on acid-washed alumina and recrystallization from a mixture of methylene chloride and ether.

EXAMPLE 15

9α-Chloro-17α-Methoxy-11β-Hydroxy-4-Pregnene 3,20-Dione

In the manner described in the preceeding example and using 9α-chloro-11β-17α-dihydroxy-4-pregnene-3,20-dione as the steroid starting material, the product obtained after reaction with methyl iodide and silver oxide is 9α-chloro-17α-methoxy-11β-hydroxy-4-pregnene-3,20-dione.

EXAMPLE 16

9α-Bromo-17α-Methoxy-11β-Hydroxy-4-Pregnene-3,20-Dione

In the manner described in the preceeding example and using as the steroid starting material 9α-bromo-11β,17α-dihydroxy-4-pregnene-3,20-dione and reacting it with methyl iodide and silver oxide, the product obtained after purification and crystallization is 9α-bromo-17α-methoxy-11β-hydroxy-4-pregnene3,20-dione.

Using more strenuous reaction conditions, one of the reaction products which may be formed is 9,11-oxido-17α-methoxy-4-pregnene-3,20-dione which is converted to 9α-bromo-17α-methoxy-11β-hydroxy-4-pregnene-3,20-dione by treatment with hydrogen bromide.

EXAMPLE 17

21-Acetoxy-17αEthoxy-11β-Hydroxy-4-Pregnene-3,20-Dione

A mixture is prepared of 50 mg. of 21-acetoxy-11β,17α-dihydroxy-4-pregnene-3,20-dione, 2.5 ml. of methyl iodide and 150 mg. of silver oxide prepared according to the procedures described in Example 1. The mixture is stirred at the reflux temperature for 72 hours. The formed inorganic precipitate comprising silver iodide is filtered and the precipitate washed with chloroform to recover any occluded steroid. The washings and filtrate are combined and evaporated under reduced pressure to give a crude residue comprising 21-acetoxy-17α-ethoxy-11β-hydroxy-4-pregnene-3,20-dione. The occluded product is purified by chromatography on acid-washed alumina and recrystallization from methylene chloride ether.

In similar manner the 17-ethinyl ether of 21-acetoxy-11β,17α-dihydroxy-4-pregnene-3,20-dione is prepared by reaction with ethinyl iodide in the presence of silver oxide and purified by chromatography and recrystallization.

EXAMPLE 18

*21-Acetoxy-17α-Methoxy-11β-Hydroxy-4-Pregnene-3,20-Dione*

A mixture is prepared of 100 mg. of 21-acetoxy-11β,17α-dihydroxy-4-pregnene-3,20-dione, 300 mg. of silver oxide and 10 ml. of methyl iodide. The resulting suspension is maintained at the reflux temperature with stirring for approximately 48 hours. The formed inorganic precipitate is filtered off, the filtrate concentrated under reduced pressure to give an iol comprising 21-acetoxy-17α-methoxy-11β-hydroxy-4-pregnene-3,20-dione. The crude product is then chromatographed on 4 g. of acid-washed alumina. The column is then eluted and crystals of product are obtained from the eluate having the composition of ether-chloroform 1:1 and 2:3. The crystalline product is recrystallized from methylene chloride-ether and melted at (199° C.) (200–205° C.).

$\lambda_{max.}^{Nujol}$ 2.8, 5.78, 5.80, 6.00, 6.2, 8.0, 8.1μ

EXAMPLE 19

*21-Acetoxy-17α-Vinyloxy-11β-Hydroxy-4-Pregnene-3,20-Dione*

A mixture is prepared of 50 mg. of 21-acetoxy-11β,17α-dihydroxy-4-pregnene-3,20-dione, 2.5 ml. of vinyl bromide and 150 mg. of silver oxide prepared according to the procedures described in Example 1. The mixture is stirred at the reflux temperature for 72 hours. The formed inorganic precipitate comprising silver bromide is filtered and the precipitate washed with chloroform to recover any occluded steroid. The washings and filtrate are combined and evaporated under reduced pressure to give a crude residue comprising 21-acetoxy-17α-vinyloxy-11β-hydroxy-4-pregnene-3,20-dione. The recovered product is purified by chromatography on acid-washed alumina and recrystallization from methylene chloride and ether.

EXAMPLE 20

*21-Acetoxy-17α-Propoxy-11β-Hydroxy-4-Pregnene-3,20-Dione*

A mixture is prepared of 50 mg. of 21-acetoxy-11β,17α-dihydroxy-4-pregnene-3,20-dione, 2.5 ml. of N-propyl iodide and 150 mg. of silver oxide prepared according to the procedures described in Example 1. The mixture is stirred at the reflux temperature for 72 hours. The formed inorganic precipitate comprising silver iodide is filtered and the precipitate washed with chloroform to recover any occluded steroid. The washings and filtrate are combined and evaporated under reduced pressure to give a crude residue comprising 21-acetoxy-17α-propoxy-11β-hydroxy-4-pregnene-3,20-dione. The occluded product is purified by chromatography on acid-washed alumina and recrystallization from methylene chloride and ether.

In similar manner the 17-propyl ether of 21-acetoxy-17α-hydroxy-4-pregnene-3,11,20-trione is prepared by reaction with propyl iodide in the presence of silver oxide and purified by chromatography and recrystallization.

EXAMPLE 21

*21-Acetoxy-17α-Methoxy-4-Pregnene-3,11,20-Trione*

To 100 mg. of 21-acetoxy-17α-hydroxy-4-pregnene-3,11,20-trione in 5 ml. of methyl iodide is added 300 mg. of silver oxide prepared according to the precedure described in Example 1. The reaction mixture is stirred at the reflux temperature for approximately 72 hours. The entire mixture is then filtered to remove the formed inorganic precipitate comprising silver iodide and washed with chloroform to recover the steroid product. The filtrate and washings are combined and evaporated in vacuo to give a crude residue comprising 21-acetoxy-17α-methoxy-4-pregnene-3,11,20-trione which is purified by chromatography on acid-washed alumina followed by recrystallization from a mixture of methylene chloride and ether.

EXAMPLE 22

*21-Acetoxy-17α-Methoxy-1,4-Pregnadiene-3,11,20-Trione*

To 100 mg. of 21-acetoxy-17α-hydroxy-1,4-pregnadiene-3,11,20-trione is added 300 mg. of silver oxide in 10 ml. of methyl iodide. The resulting suspension is maintained at the reflux temperature with stirring for 48 hours. The formed inorganic precipitate is removed by filtration and the filtrate containing the product evaporated under reduced pressure. The crude residue comprising the product is then chromatographed on 3 g. of acid-washed alumina. The chromatographed column is eluted and crystals of product are obtained from the eluate having the solvent composition of ether-chloroform 3:2 and 1:1. The crystalline product is further purified by recrystallization from methylene chloride and ether. The purified crystalline product melted at (203° C.) 205–208° C., $\lambda_{max.}^{Nujol}$ 5.75, 5.88, 6.01, 6.17, 6.23μ

EXAMPLE 23

*21-Acetoxy-11β-Hydroxy-17α-Methoxy-1,4-Pregnadiene-3,20-Dione*

In the manner described in Example 21, 11β-hydroxy-17α-methoxy-21-acetoxy-1,4-pregnadiene-3,20-dione is reacted with methyl iodide in the presence of silver oxide to form 21-acetoxy-11β-hydroxy-17α-methoxy-1,4-pregnadiene-3,20-dione, which may be purified by chromatography and crystallization.

EXAMPLE 24

*9α-Fluoro-21-Acetoxy-17α-Methoxy-11β-Hydroxy-16α-Methyl-1,4-Pregnadiene-3,20-Dione*

In the manner described in Example 21, 9α-fluoro-21-acetoxy - 11β,17α - dihydroxy - 16α - methyl - 1,4 - pregnadiene-3,20-dione is reacted with methyl iodide in the presence of silver oxide to form 9α-fluoro-21-acetoxy-17α-methoxy - 11β - hydroxy - 16α - methyl - 1,4 - pregnadiene-3,20-dione, which may be purified by chromatography and crystallization.

In similar manner, using as the steroid starting material 21 - acetoxy - 17α - hydroxy - 16α - methyl - 4 - pregnene-3,11,20-trione, the product obtained after chromatography and recrystallization is 21-acetoxy-17α-methoxy-16α-methyl-4-pregnene-3,11,20-trione.

In the same manner and using as the steroid starting material 21 - acetoxy - 11β,17α - dihydroxy - 16α-methyl-4-pregnene-3,20-dione, there is obtained after purification and recrystallization 21-acetoxy-17α-methoxy-11β-hydroxy-16α-methyl-4-pregnene-3,20-dione.

In similar manner, using as the steroid starting material 21 - acetoxy - 17α - hydroxy - 16α - methyl - 1,4 - pregnadiene-3,11,20-trione, the product obtained after crystallization is 21-acetoxy-17α-methoxy-16α-methyl-1,4-pregnadiene-3,11,20-trione.

In the same manner and using as the steroid starting material 21 - acetoxy - 11β,17α - dihydroxy - 16α - methyl-1,4-pregnadiene-3,20-dione, the product obtained after purification and recrystallization is 21-acetoxy-17α-methoxy-11β-hydroxy-16α-methyl-1,4-pregnadiene-3,20-dione.

In the same manner, using as the steroid starting material 21 - acetoxy - 11β,17α - dihydroxy - 16β - methyl-4-pregnene-3,20-dione, the product obtained after purification and recrystallization is 21-acetoxy-17α-methoxy-11β-hydroxy-16β-methyl-4-pregnene-3,20-dione.

EXAMPLE 25

*21-Acetoxy-17α-Methoxy-11β-Hydroxy-6α-Methyl-4-Pregnene-3,20-Dione*

In the manner described in Example 21, 21-acetoxy-11β,17α-dihydroxy-6α-methyl-4-pregnene-3,20-dione is reacted with methyl iodide in the presence of silver oxide to form 21-acetoxy-17α-methoxy-11β-hydroxy-6α-methyl-4-pregnene-3,20-dione, which is purified by chromatography and crystallization.

EXAMPLE 26

*21-acetoxy-17α-methoxy-pregnane-3,11,20-trione*

In the manner described in Example 2 and using as the steroid starting material 21-acetoxy-17α-hydroxy-pregnane-3,11,20-trione and reacting it with methyl iodide in the presence of silver oxide, the product obtained after purification and recrystallization is 21-acetoxy-17α-methoxy-pregnane-3,11,20-trione.

In the same manner and using as the steroid starting material 21-acetoxy-11β,17α-dihydroxy-pregnane-3,20-dione and reacting it with ethyl iodide in the presence of silver oxide, the product obtained after purification and recrystallization is 21-acetoxy-17α-ethoxy-11β-hydroxy-pregnane-3,20-dione.

In the same manner and using as the steroid starting material 21-acetoxy-17α-hydroxy-16α-methyl-pregnane-3,11,20-trione and reacting it with N-propyl iodide in the presence of silver oxide, the product obtained after purification and recrystallization is 21-acetoxy-17α-propoxy-16α-methyl-pregnane-3,11,20-trione.

In the same manner and using as the steroid starting material 17α-hydroxy-allopregnane-3,20-dione and reacting it with n-pentyl iodide in the presence of silver oxide, the product obtained after purification and recrystallization is 17α-amoxy-allopregnane-3,20-dione.

The 17α-hydroxy-16α-methyl-3,20-diketo steroids of the pregnane series used as starting materials in the above examples are prepared, starting with the known 3α-acetoxy-16-pregnene-11,20-dione, in accordance with the following procedures:

A solution of 10.22 g. of methyl iodide in 50 ml. of ether is added to 1.73 g. of magnesium in 50 ml. of ether. To the resulting ethereal solution of methyl magnesium iodide, maintained under a nitrogen atmosphere, is added 0.045 g. of anhydrous cuprous chloride. To this mixture is added, over a period of about one hour, during which period the reaction mixture is stirred vigorously and maintained at approximately room temperature, a solution of about 5.6 g. of 3α-acetoxy-16-pregnene-11,20-dione in 175 ml. of ether. A white granular solid separates during this addition. The resulting mixture is heated under gentle reflux for two hours after which the reaction mixture is cooled, and 125 ml. of saturated, aqueous ammonium chloride solution is added followed by 200 ml. of ether. The layers are separated, and the ethereal layer is washed with three 50 ml. portions of water. The washed ethereal layer is dried, and the solvent evaporated in vacuo to give a brown viscous oil. The latter material is heated for 15 minutes at 60–70° C. with a mixture of 25 ml. acetic anhydride and 25 ml. pyridine and the acetylated product is purified by chromatography on acid-washed alumina followed by crystallization from petroleum ether to give approximately 1.5 g. of substantially pure 3α-acetoxy-16α-methylpregnane-11,20-dione.

To a solution of 0.8 g. of 3α-acetoxy-16α-methylpregnene-11,20-dione in 40 ml. of methanol is added 1.5 ml. of concentrated aqueous hydrochloric acid and the resulting solution is stirred overnight at about 25° C. The reaction solution is evaporated in vacuo at 25° C. to a small volume, and the concentrated solution is poured into 50 ml. of ice water. The white solid which precipitates is recovered by filtration, washed with water and recrystallized from ethyl acetate to give 3α-hydroxy-16α-methyl-pregnane-11,20-dione.

A solution of 22 g. of 3α-hydroxy-16α-methylpregnane-11,20-dione and 1 g. of p-toluene-sulfonic acid in 250 ml. of acetic anhydride is heated at reflux under nitrogen for a period of approximately 3 days. Two grams of potassium acetate (anhydrous) is added, and the volatile solvents are separated by distillation in vacuo. The residual material is extracted with benzene, and the benzene extract is filtered to remove insoluble material. The benzene extracts are evaporated to a volume of 100 ml. and petroleum ether is added to the cloud point. The resulting solution is adsorbed on 660 g. of acid-washed alumina; the alumina adsorbate is then washed with 2 liters of petroleum ether. The adsorbate is then eluted with 85:15 petroleum ether-ether mixture, and the first four liters of eluate is collected, and evaporated to dryness in vacuo to give a mixture of enol acetates containing 3α,20-diacetoxy-16α-methyl-17(20)-pregnene-11-one. This mixture of enolates, weighing approximately 14 g., is is dissolved in 50 ml. of benzene and treated with an excess of perbenzoic acid over a 16-hour period. The reaction mixture is shaken with dilute aqueous potassium hydroxide solution until the benzene layer is free of perbenzoic acid; the benzene layer is then washed with water until neutral, dried, and the solvent evaporated in vacuo to give a crystalline material, 3α,20-diacetoxy-17α,20-epoxy-16α-methyl-pregnane-11-one. The latter material is dissolved, with purification, in 200 ml. of methanol, 120 ml. of water and 10 g. of potassium bicarbonate, and the resulting solution is heated at reflux under nitrogen for a period of 16 hours. The methanol is evaporated from the hydrolysis solution in vacuo, and the residual oil is extracted from the resulting aqueous solution with chloroform. The chloroform extract is washed with water to neutrality, dried, and the chloroform is evaporated under reduced pressure. The residual oil is triturated with ether, and the crystalline material thus formed is recrystallized from ethyl acetate-petroleum ether to give 3α,17α-dihydroxy-16α-methylpregnane-11,20-dione.

To a solution of 7.0 g. of 3α,17α-dihydroxy-16α-methylpregnane-11,20-dione in 50 ml. of chloroform is added dropwise with stirring a solution containing 3.36 g. of bromine in 24.2 ml. of chloroform over a period of about 60 minutes. The reaction mixture is dissolved in 200 ml. of ethyl acetate, and the resulting solution washed with water until neutral, dried, and the solvents evaporated therefrom in vacuo. The residual crude material is dissolved in a minimum quantity of ethyl acetate, the resulting solution is diluted with ether, and the mixture is stirred until crystals form. The crystalline product is recovered by filtration and washed, by slurrying, with 50:50 ether-petroleum ether mixture to give about 5 g. of 21 - bromo - 3α,17α - dihydroxy - 16α - methylpregnane-11,20-dione.

This 5 g. of 21-bromo-3α,17α-dihydroxy-16α-methylpregnane-11,20-dione is mixed with 5.0 g. of anhydrous potassium acetate, 4.0 g. of sodium iodide and 0.03 ml. of glacial acetic acid, and 100 ml. of acetone is added to the resulting mixture. This mixture is then heated at reflux, with stirring, for a period of about 16 hours, and the reaction mixture is cooled, filtered, and the insoluble material is washed with acetone. The filtered solution is evaporated in vacuo thereby removing the solvents, and the residual material is slurried with water, and the aqueous mixture extracted with ethyl acetate. The ethyl acetate extract is washed with water to neutrality, dried, and the solvent is evaporated in vacuo to give an oil. This oil is crystallized from ether, and recrystallized from ethyl acetate to give 21-acetoxy-3α,17α-dihydroxy-16α-methylpregnane-11,20-dione.

A solution of 400 mg. of 21-acetoxy-3α,17α-dihydroxy-16α-methylpregnane-11,20-dione in 4 ml. of pyridine is added to the complex formed by the addition of 400 mg.

of chromium trioxide to 4 ml. of pyridine. The mixture is swirled until thoroughly mixed, and then allowed to stand at room temperature overnight. The reaction mixture is poured into water, and the aqueous mixture is extracted with ether, and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by the crystallization from ethyl acetate to give 21-acetoxy-17α-hydroxy-16α-methylpregnane-3,11,20-trione.

To 100 mg. of 21-acetoxy-17α-hydroxy-16α-methylpregnane-3,11,20-trione dissolved in 2 ml. of chloroform and 2.25 ml. of glacial acetic acid, at a temperature of −55° C., is added two drops of a 0.001 N solution of dry HBr in glacial acetic acid. To about 0.38 ml. of 0.001 N HBr in glacial acetic acid, at −55° C., is added 0.43 ml. of a solution containing 40 mg. of bromine in chloroform, and the resulting solution is added, over about a 10-minute period, to the solution of the steroid, while maintaining the reaction mixture at about −55° C. The reaction mixture is allowed to stand at −55° C. for about one-half hour; a solution containing 250 mg. of sodium acetate in 3 ml. of water is added, and the resulting mixture is stirred for about 5 minutes. Five milliliters of water are then added, and the aqueous mixture is extracted with ethyl acetate. The ethyl acetate extract is washed with aqueous sodium bicarbonate solution to neutrality, then with water, dried, and the solvent is evaporated in vacuo. The residual material is dissolved in 2 ml. of acetone, and to the solution is added 25 mg. of sodium bromide and 1 ml. of water. The resulting mixture is heated under reflux for a period of about 5 hours, the reaction mixture is cooled, and the acetone is evaporated in vacuo. The residual material is extracted into ether, the ether extract is washed with water, dried, and the solvent is evaporated to a volume of about 1 ml.; petroleum ether is added to this solution, and the crystalline material which separates is recovered and dried to give approximately 90 mg. of 4-bromo-21-acetoxy - 17α - hydroxy - 16α - methylpregnane - 3,11,20-trione.

A mixture of 48 mg. of semicarbazide, 48 mg. of 4-bromo - 21 - acetoxy - 17α - hydroxy - 16α - methylpregnane-3,11,20-trione and 0.6 ml. of ethanol is heated under reflux in contact with a nitrogen atmosphere for a period of about three days, and the reaction solution is evaporated to a small volume, diluted with water and the crystalline material recovered and purified by recrystallization from aqueous methanol to give 3,20-disemicarbazido-21 - acetoxy - 17α - hydroxy - 16α - methyl - 4 - pregnene-3,11,20-trione. Fifty milligrams of 3,20-disemicarbazido-21 - acetoxy - 17α - hydroxy - 16α - methyl - 4 - pregnene-3,11,20-trione is dissolved in a mixture of 1.0 cc. of benzene and 1.0 cc. of 1.1 N methanolic potassium hydroxide, and the solution is allowed to stand at room temperature for a period of about 10 minutes. The solution is then acidified with acetic acid, the benzene is evaporated in vacuo, and the residual material is recrystallized from ethyl acetate to give 3,20-disemicarbazido-17α, 21 - dihydroxy - 16α - methyl - 4 - pregnene - 3,11,20-trione.

A mixture of 60 mg. of 3,20-disemicarbazido-17α,21-dihydroxy-16α-methyl-4-pregnene-3,11,20-trione, 0.2 ml. of dimethylformamide, 0.6 ml. of chloroform, and 1.5 ml. of 1.0 N aqueous hydrochloric acid is heated under reflux for a period of about three hours. The resulting two-phase system is cooled to a temperature of approximately 15° C., and the layers are separated. The aqueous layer is extracted with chloroform, and the chloroform extracts are combined with the original chloroform-dimethylformamide solution. The combined organic layer is washed with an aqueous solution of sodium bicarbonate, and the chloroform and dimethylformamide in the combined organic layer is replaced with ethyl acetate by evaporation in vacuo. Petroleum ether is added and the resulting solution is subjected to a partition chromatogram using aqueous methanol as the stationary phase and benzene-chloroform as the moving phase to give 17α,21-dihydroxy-16α-methyl-4-pregnene-3,11,20-trione.

A solution of 45 mg. of 3,20-disemicarbazido-21-acetoxy-17α-hydroxy-16α-methyl - 4 - pregnene-3,11,20-trione, 17 mg. of sodium borohydride, 1 ml. of tetrahydrofuran and 0.3 ml. of water is maintained at reflux temperature for approximately one hour. The reaction solution is cooled to about 15° C., and the excess sodium borohydride decomposed by the addition of a solution of 27 mg. of glacial acetic acid in 0.2 ml. of water. The tetrahydrofuran is evaporated in vacuo, and the residual material is extracted with ethyl acetate. The ethyl acetate extracts are washed with a saturated salt solution, water, 5% aqueous sodium bicarbonate solution and again with water. The extracts are dried and the ethyl acetate evaporated in vacuo to give 3,20-disemicarbazido-11β,17α,21-trihydroxy-16α-methyl - 4 - pregnene-3,20-dione.

A mixture of 60 mg. of 3,20-disemicarbazido-11β, 17α,21-trihydroxy-16α-methyl-4-pregnene - 3,20 - dione, 0.2 ml. of dimethylformamide, 0.6 ml. of chloroform, and 1.5 ml. of 1.0 N aqueous hydrochloric acid is heated under reflux for a period of about three hours. The resulting two-phase system is cooled to a temperature of approximately 15° C., and the layers are separated. The aqueous layer is extracted with chloroform, and the chloroform extracts are combined with the original chloroform-dimethylformamide solution. The combined organic layer is washed with an aqueous solution of sodium bicarbonate, and the chloroform and dimethylformamide in the combined organic layer is replaced with ethyl acetate by evaporation in vacuo. Petroleum ether is added and the resulting solution is subjected to a partition chromatogram using aqueous methanol as the stationary phase and benzene-chloroform as the moving phase to give 11β,17α,21-trihydroxy-16α-methyl-4-pregnene-3,20-dione. The latter material is reacted with an excess of acetic anhydride in pyridine at room temperature for a period of about fifteen hours, and the crude acetylated product is recrystallized from ethyl acetate to give 21-acetoxy-11β,17α-dihydroxy-16α-methyl-4-pregnene-3,20-dione.

To a cooled solution of 600 mg. of 21-acetoxy-11β, 17α-dihydroxy-16α-methyl-4-pregnene-3,20 - dione in 5.0 ml. of dry pyridine is added 0.15 ml. of phosphorous oxychloride, and the mixture is allowed to stand at room temperature for a period of approximately 15 hours. The reaction solution is evaporated in vacuo at a temperature of about 20° C. to a volume of 2-3 ml. Seventeen milliliters of water is added slowly to the concentrated solution, with stirring, and the aqueous mixture is extracted with ethyl acetate. The combined ethyl acetate extracts are washed with water, then with dilute aqueous hydrochloric acid solution, again with water, and then with a dilute aqueous sodium bicarbonate solution. The washed ethyl acetate solution is dried, and the solvent is evaporated in vacuo; the residual material is triturated with ether, and the crystalline material is recrystallized from ethyl acetate-ether to give 21-acetoxy-17α-hydroxy-16α-methyl - 4,9(11) - pregnadiene - 3,20-dione. A suspension of 330 mg. of 21-acetoxy-17α-hydroxy-16α-methyl-4,9(11)-pregnadiene-3,20 - dione and 1.8 g. of N-gromo-succinimide in a mixture of 50 ml. of dioxane and 10 ml. of water is cooled to 10° C. Then with stirring, 10 ml. of cold 1.0 N-aqueous perchloric acid is added. The temperature of the reaction mixture is allowed to rise to 15° C. and is maintained at this point for about two and one-half hours during which time the solid material slowly dissolves. The resulting yellow solution is treated with 1.0 ml. of allyl alcohol to discharge the color and the remaining N-bromo-succinimide, and the resulting solution is evaporated to a small volume in vacuo. The concentrated solution is diluted with water, and the aqueous mixture is extracted with ethyl acetate. The ethyl acetate extracts are washed, dried and evaporated to dryness, and the residual material is crystallized from ethyl acetate-ether to give 9α-bromo-21-acetoxy-11β,17α-dihydroxy-16α-methyl-4-pregnene-3,20-dione.

A solution of 210 mg. of 9α-bromo-21-acetoxy-11β,17α-dihydroxy-16α-methyl-4-pregnene-3,20-dione and 240 mg. of potassium acetate in 10 ml. of absolute ethanol is heated under reflux for two hours. The reaction mixture is cooled to room temperature, and evaporated in vacuo to a small volume. The concentrated aqueous mixture is extracted with three portions of ethyl acetate, and the combined ethyl acetate extracts are washed with water, dried, and evaporated to dryness in vacuo. The residual material is crystallized from ethyl acetate-ether to give 21-acetoxy-17α-hydroxy-9(11)-oxido-16a-methyl-4-pregnene-3,20-dione.

To a solution of 83 mg. of anhydrous hydrogen fluoride in 4.7 ml. of ice-cold alcohol-free chloroform is added an ice-cold solution of 416 mg. of 21-acetoxy-17α-hydroxy-9(11)-oxido-16α-methyl-4-pregnene-3,20-dione. The solution is mixed thoroughly and maintained at 0° C. for two hours, at the end of which time 13.0 ml. of ice-cold 20% aqueous sodium acetate is added, and the resulting mixture agitated vigorously. The layers are separated, and the chloroform layer is washed with water until free of acid, dried, and the chloroform evaporated in vacuo. The residual material is crystallized from acetone-petroleum ether to give 9α-fluoro-21-acetoxy-11β,17α-dihydroxy-16α-methyl-4-pregnene-3,20-dione. Fifty milligrams of 9α-fluoro-21-acetoxy-11β,17α-dihydroxy-16α-methyl-4-pregnene-3,20-dione is dissolved in a mixture of 1.0 cc. of benzene and 1.0 cc. of 1 N-methanolic potassium hydroxide, and the solution is allowed to stand at room temperature for a period of about ten minutes. The solution is then acidified with acetic acid, the benzene is evaporated in vacuo, and the residual material is crystallized from ethyl acetate-ether to give 9α-fluoro-11β,17α,21-trihydroxy-16α-methyl-4-pregnene-3,20-dione. The corresponding 9α-chloro-11β,17α,21-trihydroxy-4-pregnene-3,20-dione is obtained by the reaction of hydrogen chloride with 21-acetoxy-17α-hydroxy-9(11)-oxido-16α-methyl-4-pregnene-3,20-dione.

A solution of 400 mg. of 9α-fluoro-21-acetoxy-11β,17α-dihydroxy-16α-methyl-4-pregnene-3,20-dione in 4 ml. of pyridine is added to the complex formed by the addition of 400 mg. of chromium trioxide to 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by the crystallization from ethyl acetate-ether to give 9α-fluoro-21-acetoxy-17α-hydroxy-16α-methyl-4-pregnene-3,11,20-trione. Fifty milligrams of 9α-fluoro-21-acetoxy-17α-hydroxy-16α-methyl-4-pregnene-3,11,20-trione is dissolved in a mixture of 1.0 cc. of benzene and 1.0 cc. of 1 N-methanolic potassium hydroxide, and the solution is allowed to stand at room temperature for a period of about ten minutes. The solution is then acidified with acetic acid; the benzene is evaporated in vacuo, and the residual material is crystallized from ethyl acetate-ether to give 9α-fluoro-17α,21-dihydroxy-16α-methyl-4-pregnene-3,11,20-trione.

To a solution of 110 mg. of 21-acetoxy-17α-hydroxy-16α-methyl-4-pregnene-3,11,20-trione in 6 ml. t-butanol, 0.01 ml. of glacial acetic acid and 0.03 ml. of acetic anhydride is added 70 mg. of selenious acid ($H_2SeO_3$). The mixture is heated to the boiling point overnight, another 50 mg. of selenious acid is added, and the heating is continued for an additional 124 hours. The solution is decanted from metallic selenium and evaporated to an oil which is then dissolved in ethyl acetate. The ethyl acetate solution is washed with aqueous sodium bicarbonate and then with water until neutral, and dried. The solvent is evaporated from the dried solution to give an oil which is dissolved in benzene and adsorbed from this solvent on acid-washed alumina. The adsorbate is eluted with ether-petroleum ether and then with mixtures of ether and chloroform, increasingly rich in chloroform. The 4:6 ether-chloroform eluates are combined, evaporated to dryness, and the residual material recrystallized from ethyl acetate-ether to give 21-acetoxy-17α-hydroxy-16α-methyl-1,4-pregnadiene-3,11,20-trione; M.P. 208–212° C. Fifty milligrams of 21-acetoxy-17α-hydroxy-16α-methyl-1,4-pregnadiene-3,11,20-trione is dissolved in a mixture of 1.0 cc. of benzene and 1.0 cc. of 1 N-methanolic potassium hydroxide, and the solution is allowed to stand at room temperature for a period of about ten minutes. The solution is then acidified with acetic acid, the benzene is evaporated in vacuo, and the residual material is crystallized from ethyl acetate-ether to give 17α,21-dihydroxy-16α-methyl-1,4-pregnadiene-3,11,20-trione.

In similar manner 21-acetoxy-11β,17α-dihydroxy-16α-methyl-4-pregnene-3,20-dione is dehydrogenated using selenious acid to produce 21-acetoxy,11β,17α-dihydroxy-16α-methyl-1,4-pregnadiene-3,20-dione which is hydrolyzed using methanolic potassium hydroxide to give 11β,17α,21-trihydroxy-16α-methyl-1,4-pregnadiene-3,20-dione.

In the same manner 9α-fluoro-21-acetoxy-17α-hydroxy-16α-methyl-4-pregnene-3,11,20-trione is dehydrogenated with selenious acid to produce 9α-fluoro-21-acetoxy-17α-hydroxy-16α-methyl-1,4-pregnadiene-3,11,20-trione which is hydrolyzed using methanolic potassium hydroxide to give 9α-fluoro-17α,21-dihydroxy-16α-methyl-1,4-pregnadiene-3,11,20-trione.

In the same manner 9α-fluoro-21-acetoxy-11β,17α-dihydroxy-16α-methyl-4-pregnene-3,20-dione is dehydrogenated using selenious acid to give 9α-fluoro-21-acetoxy-11β,17α-dihydroxy-16α-methyl-1,4-pregnadiene-3,20-dione which is hydrolyzed using methanolic potassium hydroxide to give 9α-fluoro-11β,17α,21-trihydroxy-1,4-pregnadiene-3,20-dione.

16β-methyl compounds of the pregnane series used as starting materials can be prepared in accordance with the following procedures:

To a solution of 3α-acetoxy-16-pregnene-11,20-dione in a mixture of tetrahydrofuran and ethyl ether is added diazomethane to produce 3α-acetoxy-16α,17α-methyleneazopregnane-11,20-dione (M.P. 186–190° C.) which precipitated from solution. Heating this compound at about 180° C. in vacuo produces 3α-acetoxy-16-methyl-16-pregnene-11,20-dione (M.P. 165–167° C.) which upon reaction with hydrogen peroxide in the presence of sodium hydroxide in methanol solution for 18 hours at room temperature affords 16α,17α-oxido-3α-hydroxy-16β-methylpregnane-11,20-dione (M.P. 178–180° C.). When this compound is treated with perchloric acid in aqueous dioxane at 25–30° C. for 65 hours and the resulting reaction mixture is diluted with water a mixture of 3α,17α-dihydroxy-16-methyl-15-pregnene-11,20-dione and 3α,17α-dihydroxy-16-methylenepregnane (M.P. 158–167° C.) which is precipitated and recovered by filtration. Reduction of this mixture with hydrogen in methanol in the presence of palladium-calcium carbonate catalyst affords a mixture of 3α,17α-dihydroxy-16α-methylpregnane-11,20-dione and 3α,17α-dihydroxy-16β-methylpregnane-11,20-dione sintering at 150° C. Bromination of this mixture with bromine in chloroform at 40–45° C. affords a mixture of 21-bromo-3α,17α-dihydroxy-16α-methylpregnane-11,20-dione and 21-bromo-3α,17α-dihydroxy-16β-methylpregnane-11,20-dione which upon reaction with potassium acetate and potassium iodide in acetone produces a mixture of 21-acetoxy-3α, 17α-dihydroxy-16β-methylpregnane-11,20-dione - 21 - acetate and 21-acetoxy-3α,17α - dihydroxy-16α-methylpregnane-11,20-dione. To a solution of this mixture in aqueous t-butanol at 10–15° C. is added N-bromo-succinimide to produce a mixture of 21-acetoxy-17α-hydroxy-16α-methylpregnane-3,11,20-trione and 21-acetoxy-17α-hydroxy-16β-methylpregnane-3,11,20-trione which on chromatography on neutral alumina and elution with chloroform-benzene (1:1) and benzene yields 21-actoxy-17α-hydroxy - 16β-methylpregnane-3,11,20-trione (M.P. 210–213° C.). Reaction of this compound with bromine in a mixture of acetic acid and chloroform affords the corresponding 4-bromo compound (M.P. 165–170° C. dec.) which is converted by reaction with semicarbazide to the 3-semicarbazone of 21-acetoxy-17α-hydroxy-16β-methyl-4-pregnene-3,11,20-trione. Treatment of this compound with a mixture of acetic acid and pyruvic acid gives 21-acetoxy-17α-hydroxy-16β-methyl-4-pregnene - 3,11,20 - trione (M.P. 226-232° C.). Conversion of this compound to the disemicarbazone, reduction of the disemicarbazone with sodium borohydride, and cleavage of the reduction product affords 11β,17α,21-trihydroxy-16β-methyl-4-pregnene-3,20-dione. Acetylation of this product with acetic anhydride in the presence of pyridine gives the 21-acetoxy compound which is converted to the corresponding 1,4-pregnadiene compound by reacting it with selenium dioxide in t-butyl alcohol under reflux for 48 hours. The 21 - acetoxy-11β,17α-dihydroxy-16β-methyl - 1,4 - pregnadiene-3,20-dione so obtained is then reacted with potassium bicarbonate in aqueous methanol to produce the 21-alcohol.

In the same way other 21-acylates, in particular those in which the acyl substituent is a radical of a hydrocarbon carboxylic acid having from one to nine carbon atoms, which are especially suitable starting materials for the processes of the present invention are obtained. Thus, upon intimately contacting the 11β,17α,21 - trihydroxy-16β-methyl-1,4-pregnadiene-3,20-dione with benzoic acid anhydride, butyric acid anhydride, phenylacetic acid anhydride, succinic acid anhydride, and the like the corresponding 21-acylate is obtained.

The 11β-hydroxy-16β-methyl-1,4-pregnadiene or the corresponding 4-pregnene compounds prepared as described above are then converted to the corresponding 9α-halo-11β-hydroxy-1,4-pregnadiene or the corresponding 4-pregnene compounds in accordance with the following known procedures:

The selected 11β - hydroxy-16β-methyl-4-pregnene or 1,4-pregnadiene compound is dissolved in a mixture of dimethylformamide and pyridine to which is added methanesulfonyl chloride and the mixture heated for about an hour to form the corresponding 16β - methyl-4,9(11)-pregnadiene or 1,4,9(11)-pregnatriene compound which is recovered by precipitation with water and filtration of the precipitate. The selected 16β-methyl-4,9(11)-pregnadiene or 16β-methyl-1,4,9(11)-pregnatriene is then contacted in solution with a mixture of N-bromo-succinimide and perchloric acid to form the corresponding 9α-bromo-11β-hydroxy-16β-methyl-4-pregnene or 1,4 - pregnadiene compound which is recovered by precipitation with water and filtration of the precipitate. The bromohydrin thus obtained is then contacted with sodium methoxide in a mixture of tetrahydrofuran and methanol to produce the corresponding 9(11) - oxido-16β-methyl-1,4-pregnadiene or 4-pregnene compound which is recovered by extraction and filtration.

The 16α-methyl-17α-hydroxy progesterone starting materials are prepared in the following manner:

To a solution of 85 mg. of 17α,21-dihydroxy-16α-methyl-4-pregnene-3,11,20-trione in 0.5 ml. of pyridine, cooled to 0° C., is added 0.03 ml. of methane-sulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 21-methanesulfonyloxy-17α-hydroxy-16α-methyl-4-pregnene-3,11,20-trione.

To 180 mg. of 21-methanesulfonyloxy-17α-hydroxy-16α-methyl-4-pregnene-3,11,20-trione dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered, washed with water, and dried to give 21-iodo-17α-hydroxy-16α-methyl-4-pregnene-3,11,20-trione.

This 21-iodo-17α-hydroxy-16α-methyl-4-pregnene-3,11,20-trione is dissolved in a mixture of 5 ml. of water and 5 ml. of ethanol. To the resulting suspension is added 500 mg. of sodium bisulfite and the mixture is heated under reflux for a period of about 1 hour. The reaction solution is cooled, diluted with water, and the crystalline material which separates is recovered, washed with water, dried and recrystallized from ethyl acetate to give 17α-hydroxy-16α-methyl-4-pregnene-3,11,20-trione.

In similar manner 17α,21-dihydroxy-16β-methyl-4-pregnene-3,11,20-trione is treated with methanesulfonylchloride to produce the corresponding 21-methanesulfonate which is then treated with sodium iodide to produce the corresponding 21-iodo compound and the resulting 21-iodo compound is heated with aqueous sodium bisulfite solution to give 17α-hydroxy-16β-methyl-4-pregnene-3,11,-20-trione.

In similar manner 11β,17α,21-trihydroxy-16α-methyl-4-pregnene-3,20-dione is treated with methanesulfonylchloride to give the corresponding 21-methanesulfonate which is then treated with sodium iodide to give 21-iodo-11β,17α-dihydroxy - 16 - methyl - 4 - pregnene-3,20-dione which is heated with aqueous sodium bisulfite solution to give 11β,17α-dihydroxy-16α-methyl-4-pregnene-3,20-dione.

Similarly,

11β,17α,21-trihydroxy-16β-methyl-4-pregnene-3,20-dione,

9α-fluoro-17α,21-dihydroxy-16α-methyl-4-pregnene-3,11,20-trione,

9α-fluoro-17α,21-dihydroxy-16β-methyl-4-pregnene-3,11,20-trione,

9α-fluoro-11β,17α,21-trihydroxy-16α-methyl-4-pregnene-3,20-dione,

17α,21-dihydoxy-16α-methyl-1,4-pregnadiene-3,11,20-trione,

11β,17α,21-trihydroxy-16α-methyl-1,4-pregnadiene-3,20-dione and

9α-fluoro-17α,21-dihydroxy-16α-methyl-1,4-pregnadiene-3,11,20-trione are converted respectively to 11β,17α-dihydroxy-16β-methyl-4-pregnene-3,20-dione, 9α-fluoro-17α-hydroxy-16α-methyl-4-pregnene-3,11,20-trione, 9α-fluoro-17α-hydroxy-16β-methyl-4-pregnene-3,11,20-trione, 9α-fluoro-11β,17α-dihydroxy-16α-methyl-4-pregnene-3,20-dione, 17α-hydroxy-16α-methyl-1,4-pregnadiene-3,11,20-trione, 11β,17α-dihydroxy-16α-methyl-1,4-pregnadiene-3,20-dione and 9α-fluoro-17α-hydroxy-16α-methyl-1,4-pregnadiene-3,11-20-trione.

The 21-fluoro-17-hydroxy compounds of the pregnane series used as starting materials in the examples above are prepared according to the following procedures:

To a solution of 62 mg. of 21-methanesulfonyloxy-17α,21 - dihydroxy - 16α - methyl - 4 - pregnene - 3,11,20-trione, prepared as described above, in 1 ml. of anhydrous dimethylformamide is added sufficient anhydrous potassium fluoride to give a saturated solution. The mixture is heated at a temperature of about 110° C. for approximately 20 hours. The reaction mixture is cooled, water is added thereto, and the aqueous mixture is extracted with chloroform. The chloroform extract is dried, evaporated to dryness and the residual material chromatographed on acid-washed alumina. The alumina column is eluted first with a 1:1 mixture of ether-chloroform and then with chloroform. The chloroform eluate is evaporated and the residual material is recrystallized to give 21-fluoro-17α-hydroxy-16α-methyl-4-pregnene-3,11,20-trione.

Similarly, the other 21-methanesulfonates mentioned herein above are treated according to the same procedure to produce the corresponding 21-fluoro compounds.

Likewise, 21-fluoro-17α-hydroxy-4-pregnene-3,20-dione is prepared by first reacting the known 17α,21-dihydroxy-4-pregnene-3,20-dione with methanesulfonylchloride to produce 21-methanesulfonyloxy-17α-hydroxy-4-pregnene-3,20-dione and then heating the formed 21-methanesulfonate with potassium fluoride in dimethyl formamide to produce 21-fluoro-17α-hydroxy-4-pregnene-3,20-dione.

The 6α-methyl-17α-hydroxy progesterone starting materials are prepared according to the following procedures:

To 5 g. of 17α-hydroxy-4-pregnene-3,20-dione in 200 ml. of benzene is added 5 ml. of ethylene glycol and 100 mg. of p-toluenesulfonic acid. This mixture is refluxed under a water separator for 24 hours. An additional 5 ml. of ethylene glycol and 100 mg. of p-toluenesulfonic acid is then added and the refluxing continued for 24 hours more. The benzene is cooled and ether added. The combined solvents containing 3,20-bis-ethylenedioxy-5-pregnene-17α-ol are washed with aqueous sodium bicarbonate, dried and concentrated in vacuo to an oil. When this oil is triturated with ether, crystalline product melting at 190° C. is obtained.

2.4 g. of 3,20-bisethylenedioxy-5-pregnene-17α-ol is dissolved in 35 ml. of 0.3 molar perbenzoic acid in benzene. After standing two days at room temperature, the solution is cooled to 10° and a 15% solution of sodium bisulfite is added until a negative potassium iodide test is obtained. The benzene solution is then washed with sodium bicarbonate, dried and concentrated in vacuo to 2 g. of mixed oxides. The mixed oxides are dissolved in benzene and chromatographed on acid-washed alumina. Elution of the column with a mixture of ether-chloroform (1:1) yielded 603 mg. of the 5,6α-oxido-3,20 - bisethylenedioxypregnane - 17α-ol. Melting point 208–213° C.

$\lambda_{max.}^{Nujol}$ 2.7μ, 9.1μ

To a solution of 400 mg. of 5,6α-oxido-3,20-bisethylenedioxy-pregnane-17α-ol in 96 ml. of dry benzene under nitrogen is added 3.76 ml. of 3-molar methyl magnesium bromide in ether. The mixture is heated at 70° C. under nitrogen for 4 hours. After cooling to 5°, 9 g. of ammonium chloride in 90 ml. of water is added over a 20-minute period. The benzene is separated and the aqueous layer extracted with benzene. The combined benzene is washed neutral with water, dried and evaporated to dryness in vacuo to yield 346 mg. of oil comprising 3,20-bisethylenedioxy-6β-methyl-pregnane-5α,17α-diol, which, upon trituration with ether, forms crystals of product. M.P. 174–177° C.

A solution of 346 mg. of 3,20-bisethylenedioxy-6β-methyl-pregnane-5α,17α-diol is dissolved in 18 ml. of methanol and purged with nitrogen. 1.92 ml. of 8% sulfuric acid (v./v.) is added and then heated at reflux under nitrogen for 35 minutes. The reaction mixture is then cooled to 5° C. and a solution of 1.92 g. of sodium bicarbonate in 40 ml. of water is added with stirring. The gummy precipitate is extracted with chloroform and methylene chloride and the organic extract washed with water, dried and concentrated in vacuo to yield 311 mg. of crystalline 5α,17α-dihydroxy-6β-methyl-pregnane-3,20-dione. Melting point 250–258° C.

$\lambda_{max}^{Nujol}$ 275–282°, 5.85, 5.95, 9.1μ

To a solution of 311 mg. of 5α,17α-dihydroxy-6β-methyl-pregnane-3,20-dione in 15 ml. of methanol is added in a nitrogen atmosphere 0.47 ml. of 5% potassium hydroxide. The reaction mixture is refluxed under nitrogen for one hour. It is then cooled to 5° and acidified with a few drops of glacial acetic acid. Ten ml. of water is added and the methanol is removed by concentration in vacuo. The reaction mixture is then extracted with methylene chloride, washed with water, dried and evaporated to give 17α-hydroxy-6α-methyl-4-pregnene-3,20-dione. Melting point 200–210° C.

$\lambda_{max.}^{Nujol}$ 2.8, 5.90, 6.01, 6.25μ

Using 16α-methyl-17α-hydroxy-4-pregnene-3,20-dione as the starting material, the corresponding 6α,16α-dimethyl-17α-hydroxy-4-pregnene-3,20-dione is obtained.

The 6α-nitro-17α-hydroxy-3,20-diketo steroids of the pregnane and the 19-nor pregnane series used as starting materials in the preceeding examples are prepared according to the following procedure:

To 5 g. of 17α-acetoxy-4-pregnene-3,20-dione in 100 ml. of dry benzene (prepared by distilling off approximately 30 ml. of benzene to remove any water) is added 500 mg. of p-toluene sulfonic acid and 30 ml. of isopropenyl acetate. The combined mixture is heated at the reflux temperature for about 4 hours. Three grams of sodium acetate are then added and the mixture is distilled at atmospheric pressure until the volume is reduced to about two-thirds of its original volume (80–90 ml.). The evaporation is then continued under reduced temperature, while maintaining the temperature below 45° C., to dryness. The resulting residue comprising 3α,17α-diacetoxy-3,5-pregnadien-20-one is suspended in water and the product extracted with several portions of ether. The ether extracts are combined, washed with water and dried with magnesium sulfate and evaporated under reduced pressure to give a product which is suitable for use in the next step without further purification.

A solution of 1 g. of the 3,17α-diacetoxy-3,5-pregnadien-20-one in 20 ml. of ether is cooled to 0–5° C. in an ice bath. To the solution is added 8 ml. of fuming nitric acid over a period of about 15 minutes with constant agitation. Stirring of the mixture is continued for one hour and the resulting reaction mixture is washed with aqueous 5% sodium hydroxide solution and water until the washings are essentially neutral. The ether layer containing the product is then dried and evaporated under reduced pressure to give a crude residue comprising 6β - nitro-17α-acetoxy-4-pregnene-3,20-dione, which is further purified by recrystallization from methylene chloride-ether.

To 500 mg. of 6β-nitro-17α-acetoxy-4-pregnene-3,20-dione dissolved in 10 ml. of methanol is added 1 ml. of 10% aqueous potassium hydroxide in a nitrogen atmosphere. The methanol and the aqueous alkali are pretreated by bubbling nitrogen gas through them for several minutes prior to the preparation of the solution and the mixing with aqueous alkali. The mixture is then stirred at about 25° C. for approximately 1 hour. The entire reaction mixture is neutralized by treatment with acetic acid and the resulting mixture is evaporated to a small volume. Water is then added and the product, 6α-nitro-17α-hydroxy-4-pregnene-3,20-dione, is extracted with ether. The ether solution of product is then dried and evaporated under reduced pressure to give a residue comprising 6α-nitro-17α-hydroxy-4-pregnene-3,20-dione.

When the other esters as, for example, the 21-propionates, the 21-butyrates, the 21-benzoates and the t-butyl acetate are employed instead of the 21-acetate starting materials described in this example and the preceding Examples 17 through 26. The products formed are the 17-ethers of the corresponding 21-propionates, 21-butyrates, 21-benzoates and the 21-t-butyl acetates. These esters are hydrolyzed with alkali by known methods to produce the corresponding 17-ethers having a 21-hydroxyl group in place of the 21-ester grouping.

Any departure from the above description which conforms to the invention described is intended to be included within the scope of the impended claim.

I claim:

17α-methoxy-19-nor-4-pregnene-3,20-dione.

References Cited in the file of this patent

UNITED STATES PATENTS

| | | |
|---|---|---|
| 2,857,404 | Gash | Oct. 21, 1958 |
| 2,871,246 | Löken | Jan. 27, 1959 |
| 2,879,279 | Van Der Burg | Mar. 24, 1959 |